United States Patent
Krisl

(10) Patent No.: US 7,108,127 B2
(45) Date of Patent: Sep. 19, 2006

(54) ROD RETAINING SNAP ROD WITH ENLARGED RETAINING RING

(75) Inventor: Michal Krisl, Muttenz (CH)

(73) Assignee: Habasit AG, Reinach (CH)

( * ) Notice: Subject to any disclaimer, the term of this patent is extended or adjusted under 35 U.S.C. 154(b) by 112 days.

(21) Appl. No.: 10/891,807

(22) Filed: Jul. 15, 2004

(65) Prior Publication Data

US 2005/0016821 A1 Jan. 27, 2005

Related U.S. Application Data

(60) Provisional application No. 60/489,824, filed on Jul. 24, 2003.

(51) Int. Cl.
*B65G 17/06* (2006.01)
*B65G 17/38* (2006.01)

(52) U.S. Cl. .............. 198/853; 198/850; 198/851; 198/852

(58) Field of Classification Search ............ 198/850, 198/851, 853, 852
See application file for complete search history.

(56) References Cited

U.S. PATENT DOCUMENTS

| | | | |
|---|---|---|---|
| 586,956 A * | 7/1897 | Barker et al. ............ 474/222 |
| 812,655 A | 2/1906 | Johnson | |
| 2,649,812 A | 8/1953 | Wylie | |
| 2,852,129 A | 9/1958 | Conner | |
| 3,269,526 A | 8/1966 | Imse et al. | |
| 3,631,965 A * | 1/1972 | Koshkin et al. ............ 198/802 |
| 4,153,152 A * | 5/1979 | Lapeyre ...................... 198/851 |
| 4,505,383 A * | 3/1985 | Wheeldon et al. ........ 198/853 |
| 4,597,492 A | 7/1986 | Lachonius et al. | |
| 4,709,807 A | 12/1987 | Poerink | |
| 4,858,753 A | 8/1989 | Hodlewsky | |
| 4,911,681 A * | 3/1990 | Funkhouser ................ 474/145 |
| 5,058,732 A * | 10/1991 | Lapeyre ...................... 198/852 |
| 5,105,938 A | 4/1992 | Tan | |
| 5,156,264 A * | 10/1992 | Lapeyre ...................... 198/852 |
| 5,547,071 A | 8/1996 | Palmaer et al. | |
| 5,573,106 A | 11/1996 | Stebnicki | |
| 5,598,916 A | 2/1997 | Horton et al. | |
| 5,645,160 A * | 7/1997 | Palmaer et al. ............ 198/853 |
| 5,662,211 A * | 9/1997 | Quentin ...................... 198/853 |
| 5,678,683 A | 10/1997 | Stebnicki et al. | |
| 5,826,705 A | 10/1998 | Ramsey et al. | |
| 5,899,322 A * | 5/1999 | Gamble, Jr. ................ 198/853 |
| 5,960,937 A | 10/1999 | Stebnicki et al. | |
| 6,036,002 A * | 3/2000 | Kobayashi et al. ......... 198/853 |
| 6,213,292 B1 | 4/2001 | Takahashi et al. | |
| 6,308,825 B1 | 10/2001 | Nakamura | |
| 6,330,941 B1 | 12/2001 | Guldenfels | |
| 6,516,944 B1 | 2/2003 | Guldenfels | |
| 6,523,680 B1 | 2/2003 | Guldenfels | |
| 6,527,106 B1 | 3/2003 | Tanabe et al. | |

FOREIGN PATENT DOCUMENTS

EP  0 787 664 A  8/1997
EP  0 960 839 A  12/1999

* cited by examiner

*Primary Examiner*—Gene O. Crawford
*Assistant Examiner*—Leslie A. Nicholson, III
(74) *Attorney, Agent, or Firm*—Hodgson Russ LLP

(57) ABSTRACT

A modular belt having a first belt module and a second belt module intercalated and locked into position by a pivot rod having a head at one end and a retaining ring disposed in spaced apart relation relative to the head along the longitudinal axis.

10 Claims, 7 Drawing Sheets

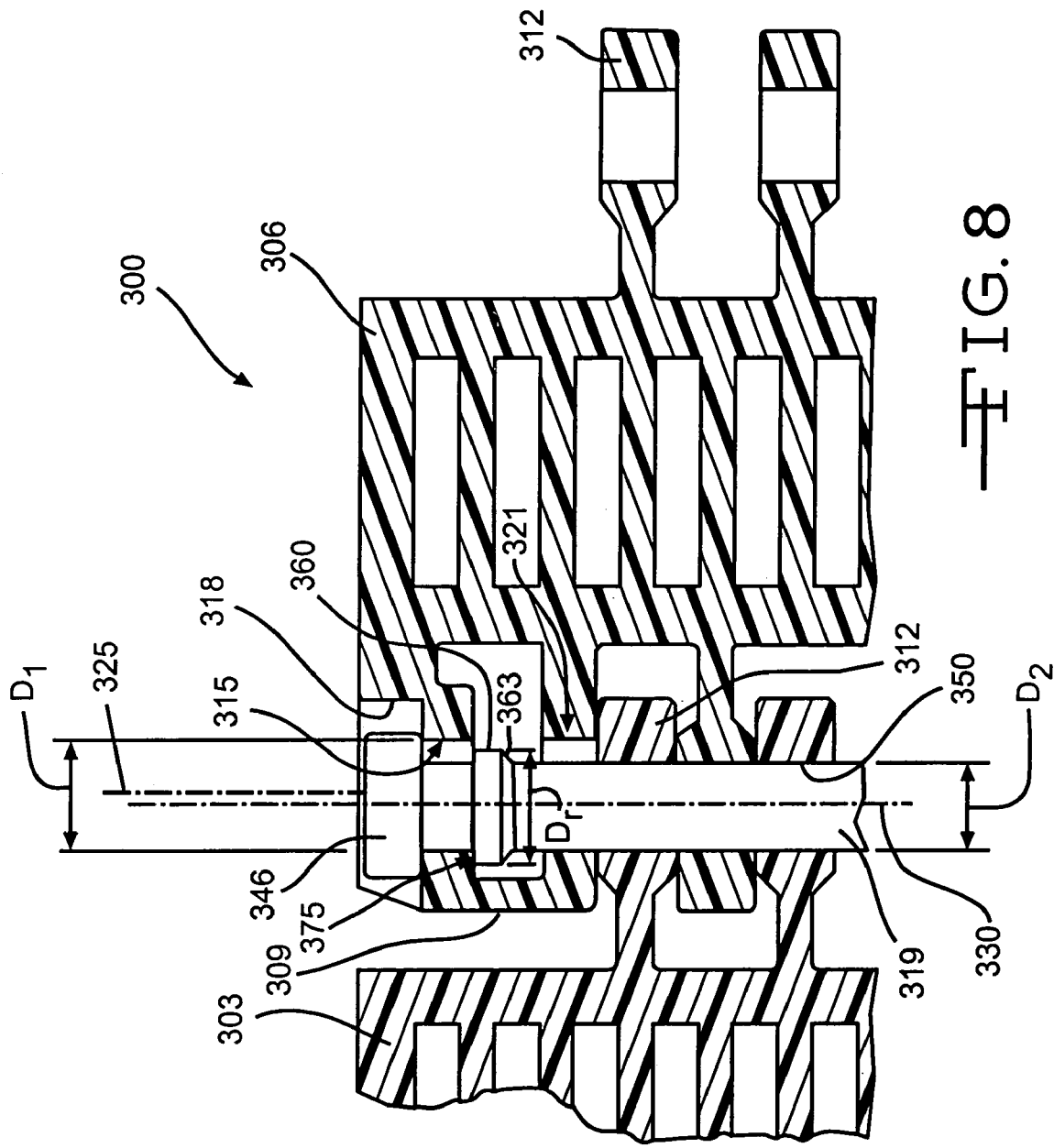

ROD RETAINING SNAP ROD WITH ENLARGED RETAINING RING

CROSS-REFERENCE TO RELATED APPLICATION

The present application claims priority to U.S. Provisional Patent Application No. 60/489,824 filed Jul. 24, 2003, entitled "Rod Retaining Snap Rod with Enlarged Retaining Ring," which is incorporated herein by reference.

FIELD OF INVENTION

The present invention relates to modular conveying apparatus.

BACKGROUND OF THE INVENTION

Because they do not corrode, are light weight, and are easy to clean, unlike metal conveyor belts, plastic conveyor belts are used widely, especially in materials handling and conveying food products. Modular plastic conveyor belts are made up of molded plastic modular links, or belt modules, that can be arranged side by side in rows of selectable width. A series of spaced apart link ends extending from each side of the modules include aligned apertures to accommodate a pivot rod. The link ends along one end of a row of modules are interconnected with link ends of an adjacent row. A pivot rod journaled in the aligned apertures of the side-by-side and end-to-end connected modules forms a hinge between adjacent rows. Rows of belt modules are then connected together to form an endless conveyor belt capable of articulating about a drive sprocket.

The retention of the pivot rod is an important feature of the modular plastic conveyor belts. Rod retention can be accomplished by enlarging the heads of the pivot rods at both ends but such would not allow for disassembly without destroying the rod head. Headless rods have been used for easier production and belt assembly. These type of rods must be blocked at both ends of the belt during use. In addition headless rods are often difficult to remove for disassembly.

One approach to rod retention is to have a head at one end of a rod and a headless section at the opposite end. The headed rod is furnished with a rod retaining ring disposed on the shaft at a distance from the head portion of the rod. The rod is inserted through the pivot holes of the module links, which are all exactly the same diameter. The retaining ring is just a little bit larger in diameter than the pivot hole of the outermost link, such that the ring may be forced through the pivot hole of the outermost link end and is able to expand behind the link. In this arrangement the rod is kept firmly in position by the retaining ring. The system described above has the drawback that it requires tight tolerances of the hole diameter of the outermost link and the retaining ring diameter. In practice, there is a risk that the rod does not retain well enough or is retained tightly and cannot be easily disassembled. In addition, if the retaining ring is a little too large, it may be sheared off when inserted.

What is needed is a device that makes the above-described tolerances less critical.

SUMMARY OF THE INVENTION

The present invention meets the above-described need by providing a snap rod system such that the retaining ring can be made larger in order to increase the size of the shoulder which engages behind the link face. At the same time due to the larger ring diameter the bore of the outermost link needs to be enlarged accordingly in order to allow the larger retaining ring to be moved through the bore. Due to the larger difference between the retaining ring and the rod diameter, the tolerance becomes less critical. In one embodiment, the bore of the outermost link end is slightly eccentric in such a way that the enlarged shoulder of the retaining ring will be clearly overlapping the link face when assembled. When the belt is under tension the rod will be firmly forced into this retaining position, without losing the ability to transmit the belt pull.

DETAILED DESCRIPTION OF THE INVENTION

Figure 1:
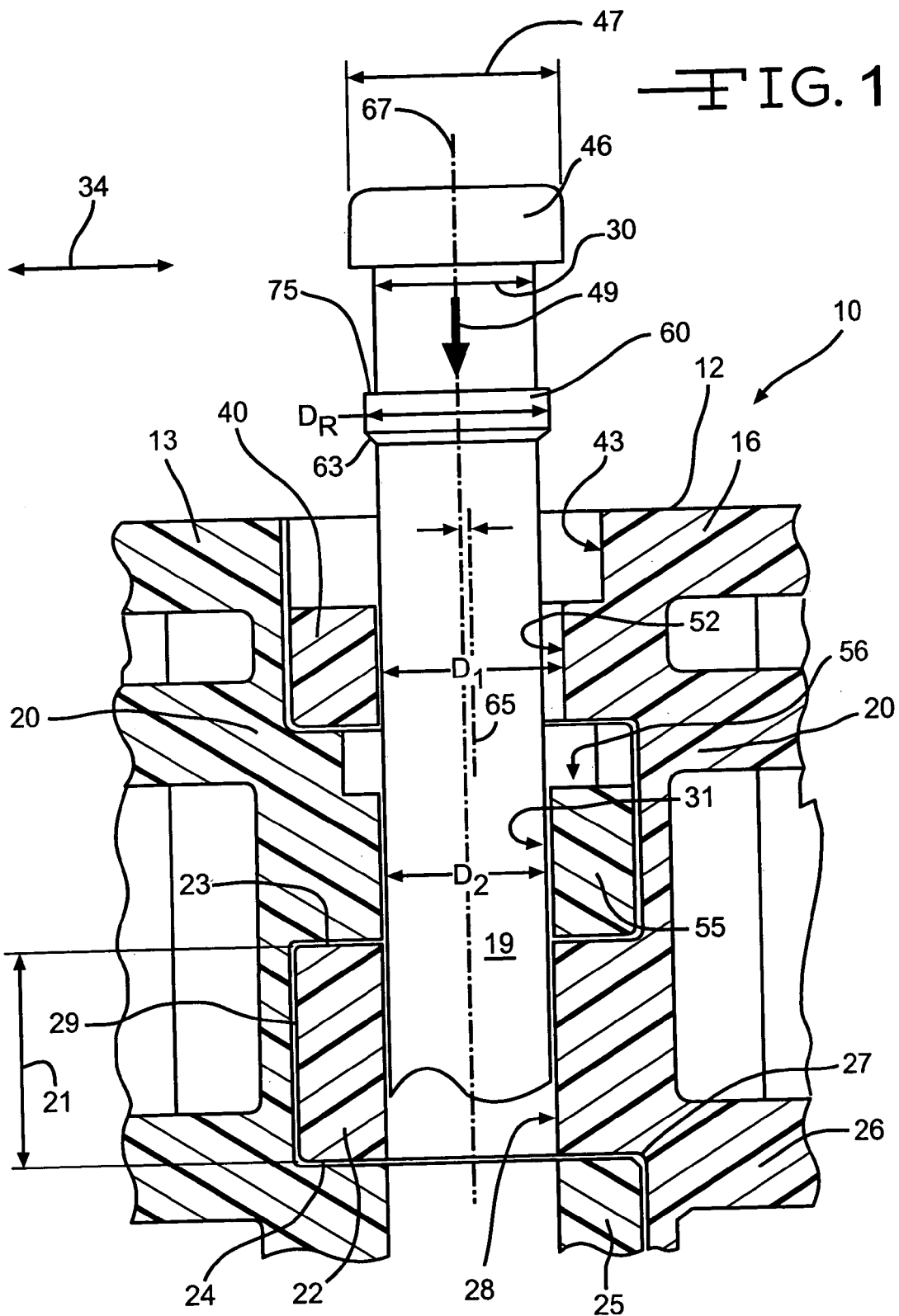
FIG. 1 is a cross-sectional plan view of the belt and pivot rod of the present invention with the pivot rod extending from the end of the belt prior to installation.

In FIGS. 1-4, a modular belt 10 is formed from a plurality of belt modules as will be evident to those of ordinary skill in the art. In FIG. 1, the outermost modules 13, 16 are shown. As will be evident to those of ordinary skill in the art, the belt 10 may be formed into varying widths in bricklayed fashion in a direction perpendicular to the direction of belt travel 34.

Each module 13, 16 has a module body 20 with a first and second plurality of link ends 22, 25 disposed in the middle of the module with respect to the outer edge 12 shown at the top of FIG. 1. Each link end 22, 25 has opposed side walls 23, 24 defining a first transverse thickness 21. The first transverse thickness 21 is connected to the intermediate section 26 of the module body 20 at a first proximal portion 27. The transverse thickness extends from the intermediate section 26 in a direction of belt travel to a first distal portion 29.

The link ends 22, 25 include openings 28, 31 disposed transverse to the direction of belt travel 34. The openings 28 and 31 receive the pivot rod 19 when adjacent belt modules 13, 16 are intercalated as shown in the figure.

The pivot rod 19 is typically round and has a diameter 30 such that the modules 13, 16 are capable of pivoting relative to each other for articulating about a sprocket (not shown). The pivot rod 19 has an end portion 46 with a diameter 47 that is greater than the diameter 30 of the pivot rod 19. The pivot rod 19 also includes a retaining ring 60 spaced apart longitudinally from the end portion 46. The retaining ring 60 has a diameter $D_r$ that is larger than the diameter of the pivot rod 19 and may be formed with a chamfered or beveled edge 63.

Figure 4:
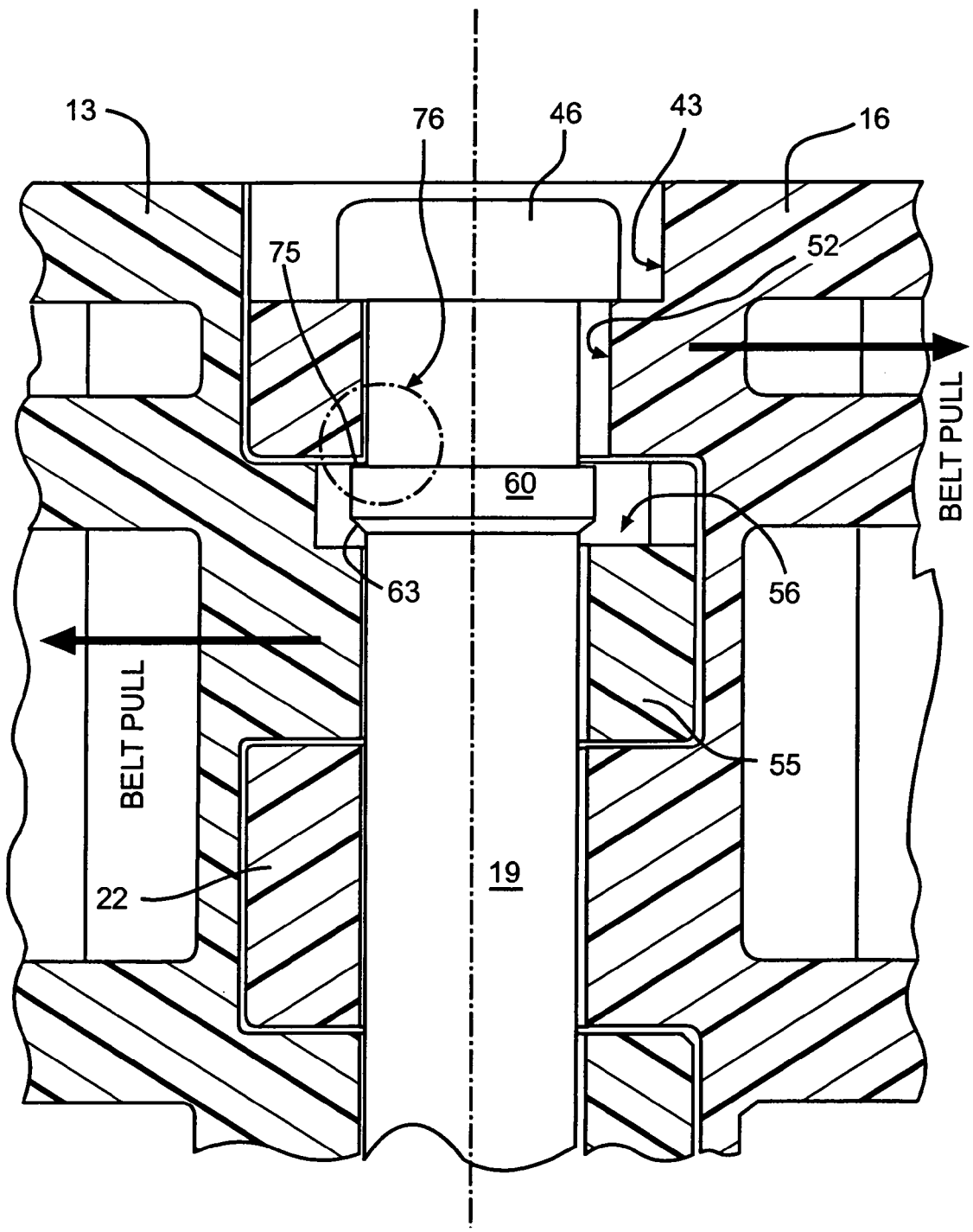
FIG. 4 is a cross-sectional plan view of the belt and pivot rod of FIG. 1 shown in the installed configuration.

Outermost link end 40 of module 16 is disposed toward the edge 12 of belt 10. The outermost link end 40 has a recessed portion 43 that is capable of receiving end portion 46 of pivot rod 19. When the pivot rod 19 is installed in the belt 10 in the direction indicated by arrow 49, the end portion 46 is received in the recessed portion 43 and abuts with the portion of the link end surrounding aperture 52 as shown in FIG. 4.

Link end 40 has an opening 52 with a diameter $D_1$ that is approximately equal to or slightly smaller than the diameter $D_r$ of the ring 60 but is larger than the diameter $D_2$ of openings 28, 31.

Belt module 13 also has a specially formed outermost link end 55 having a recessed surface 56.

Figure 3:
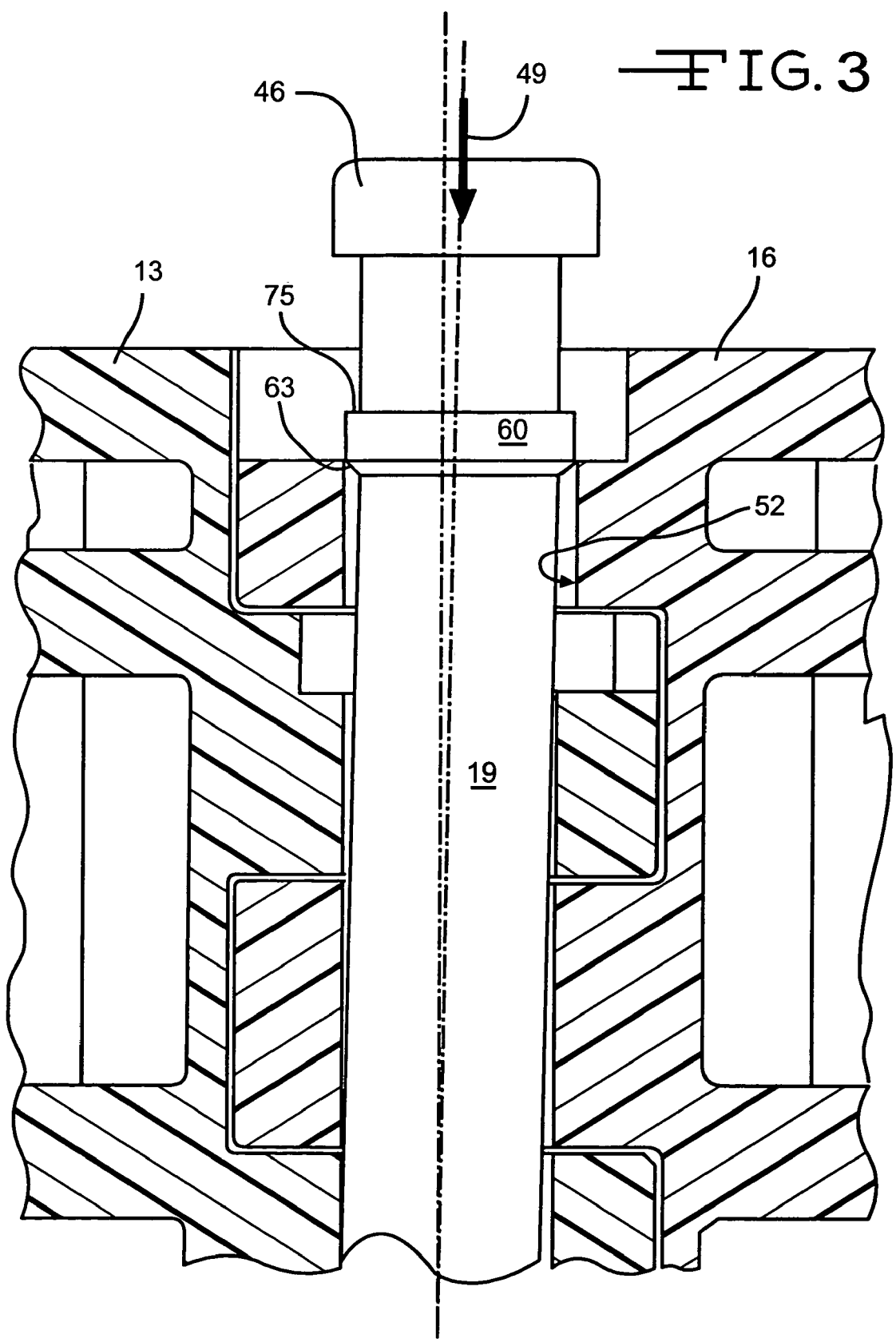
FIG. 3 is a cross-sectional plan view of the belt and pivot rod during a later stage of installation.

The central longitudinal axis 65 of aperture 52 is offset from the central longitudinal axis 67 of openings 28, 31 such that upon insertion, the pivot rod 19 is bent as shown in FIG. 3. The pivot rod 19 is bent during insertion such that once the ring 60 clears aperture 52, the enlarged shoulder 75 overlaps the link face surrounding aperture 52 as shown in the circled area 76 in FIG. 4. The axial misalignment between the apertures 52 and 31 ensures that the ring 60 does not exit from the aligned modules 13 and 16 after installation.

Figure 2:
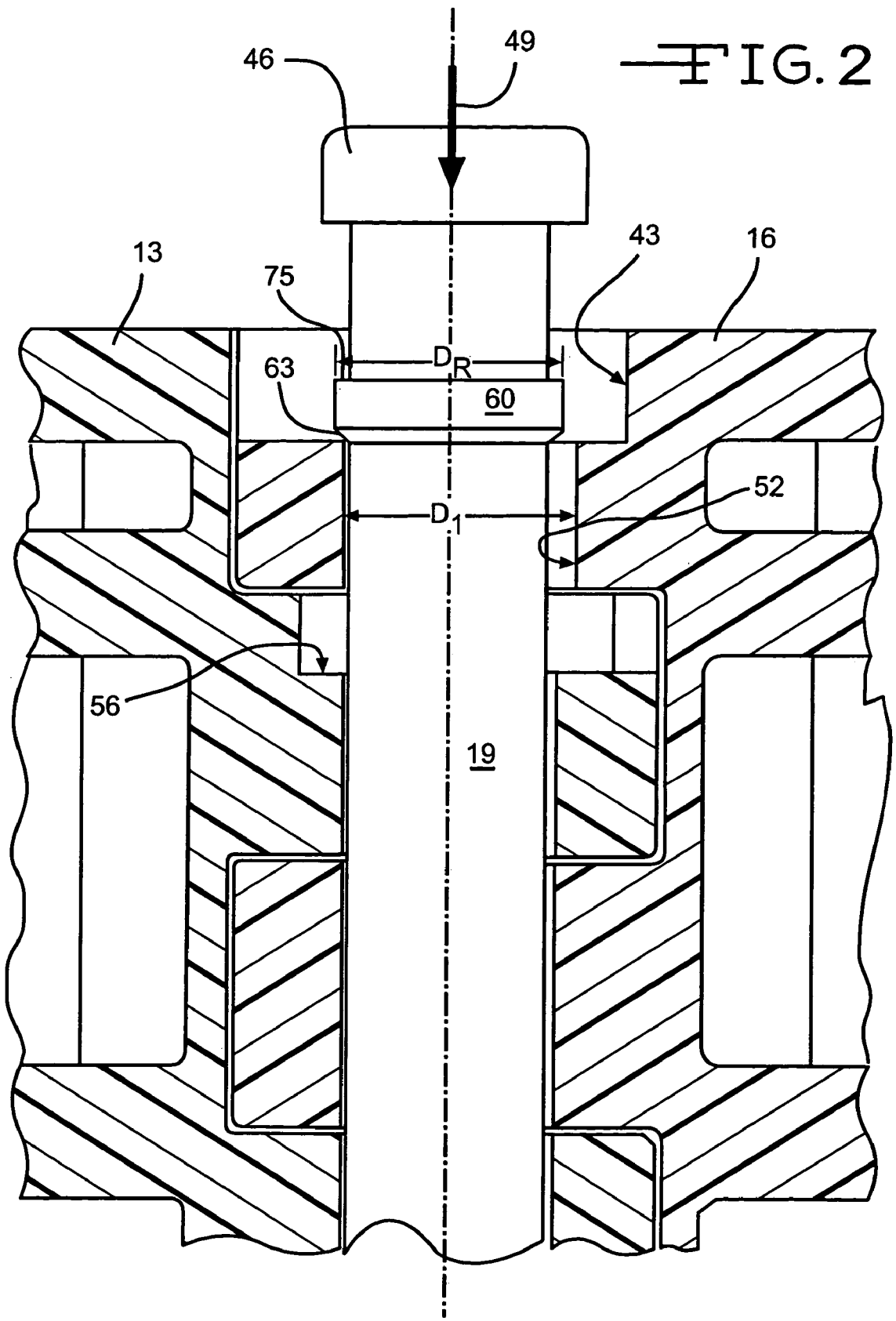
FIG. 2 is a cross-section plan view of the belt and pivot rod of FIG. 1 during the initial stage of installation of the pivot rod.

FIGS. 2–4 illustrate the position of the pivot rod 19 and the modules 13 and 16 during various stages of the installation of the pivot rod 19. In FIG. 2, the pivot rod 19 is shown at the maximum insertion point prior to bending the body or shaft of the pivot rod 19. The rod 19 has been inserted in the direction of arrow 49 until the beveled edge 63 of the retaining ring 60 engages with the edge of the opening 52 on the left hand side of the figure.

Turning to FIG. 3, deflection of the pivot rod 19 to the right side of opening 52 causes the pivot rod 19 to bend such that the retaining ring 60 aligns with the opening 52. The retaining ring 60 is sized to frictionally engage with the inside walls of opening 52 during insertion. Accordingly, the retaining ring may be roughly equal to or slightly larger in diameter $D_r$ than the inside diameter $D_1$ of opening 52. As shown, the left hand side of the beveled edge 63 clears the opening in FIG. 3 so that the retaining ring 60 may be passed through the opening 52.

In FIG. 4, the pivot rod 19 has been inserted such that the retaining ring 60 has passed all the way through opening 52 and has "snapped" back to the left in the area shown in circle 76. Once the left edge of the retaining ring 60 clears the end of the opening 52, the pivot rod 19 returns to its straight configuration. In this position, the belt modules 13, 16 are intercalated and locked together by the retaining ring 60.

Figure 5:
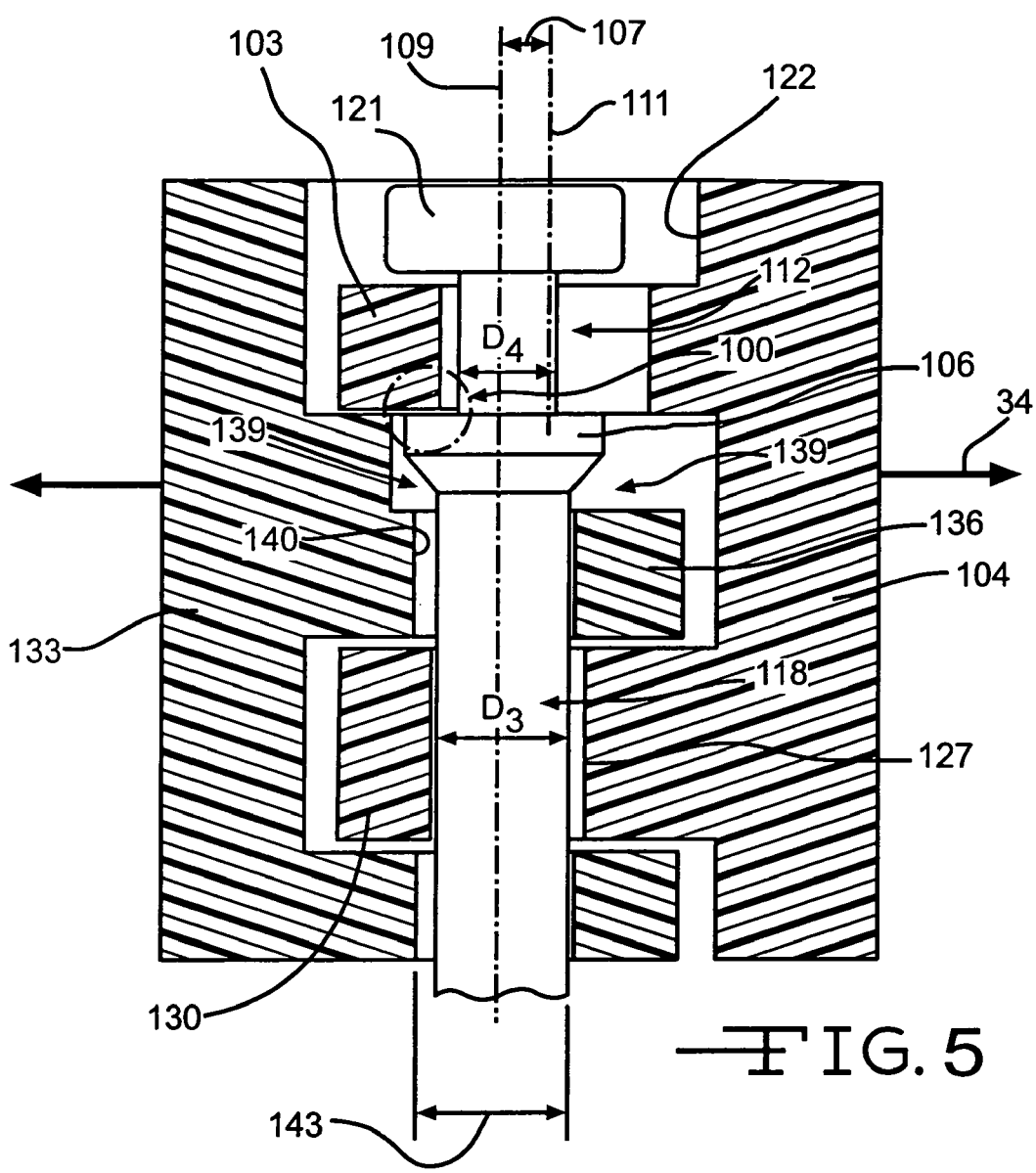
FIG. 5 is a cross-sectional view of the belt and pivot rod of an alternate embodiment of the present invention shown in the installed configuration.

Turning to FIG. 5, an alternate embodiment of the modular belt of the present invention is shown. The overlapping area 100 located between the outermost link end 103 on the first belt module 104 and the rod retaining ring 106 defines the locking behavior of the snap rod. The offset 107 between the pivot rod center axis 109 and the central axis 111 of opening 112 in the outermost link end 103 for the retaining ring 106 is a parameter that affects the locking behavior. This offset 107 can be increased by reducing the diameter $D_4$ of the rod 118 between the head 121 and the retaining ring 106. The outermost link end 103 has a recessed portion 122 that receives the head 121. The opening 112 in the outermost link end 103 is larger than the openings 127 in the plurality of link ends 130.

The second belt module 133 also has an outermost link end 136 having a recessed portion 139. The recessed portion 139 in the second belt module 133 receives the retaining ring 106 when the first and second belt modules 104, 133 are intercalated and connected by the pivot rod 118. The outermost link end 136 on the second belt module 133 has a pivot rod opening 140 with a diameter 143 that is approximately equal to the diameter of the openings 127 in the first belt module 104.

Figure 6:
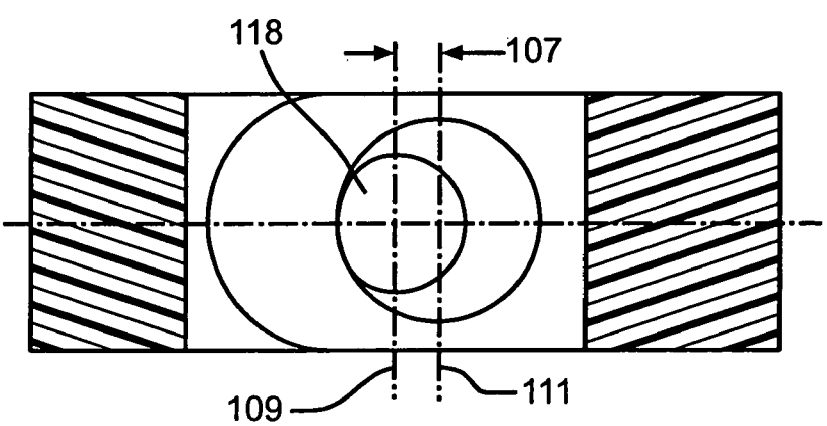
FIG. 6 is an end view of the belt with the pivot rod removed for clarity.

In FIG. 6, the offset 107 is shown from an end view of the intercalated belt modules. The pivot rod axis 109 and the central axis 111 of the opening 112 are shown.

Figure 7:
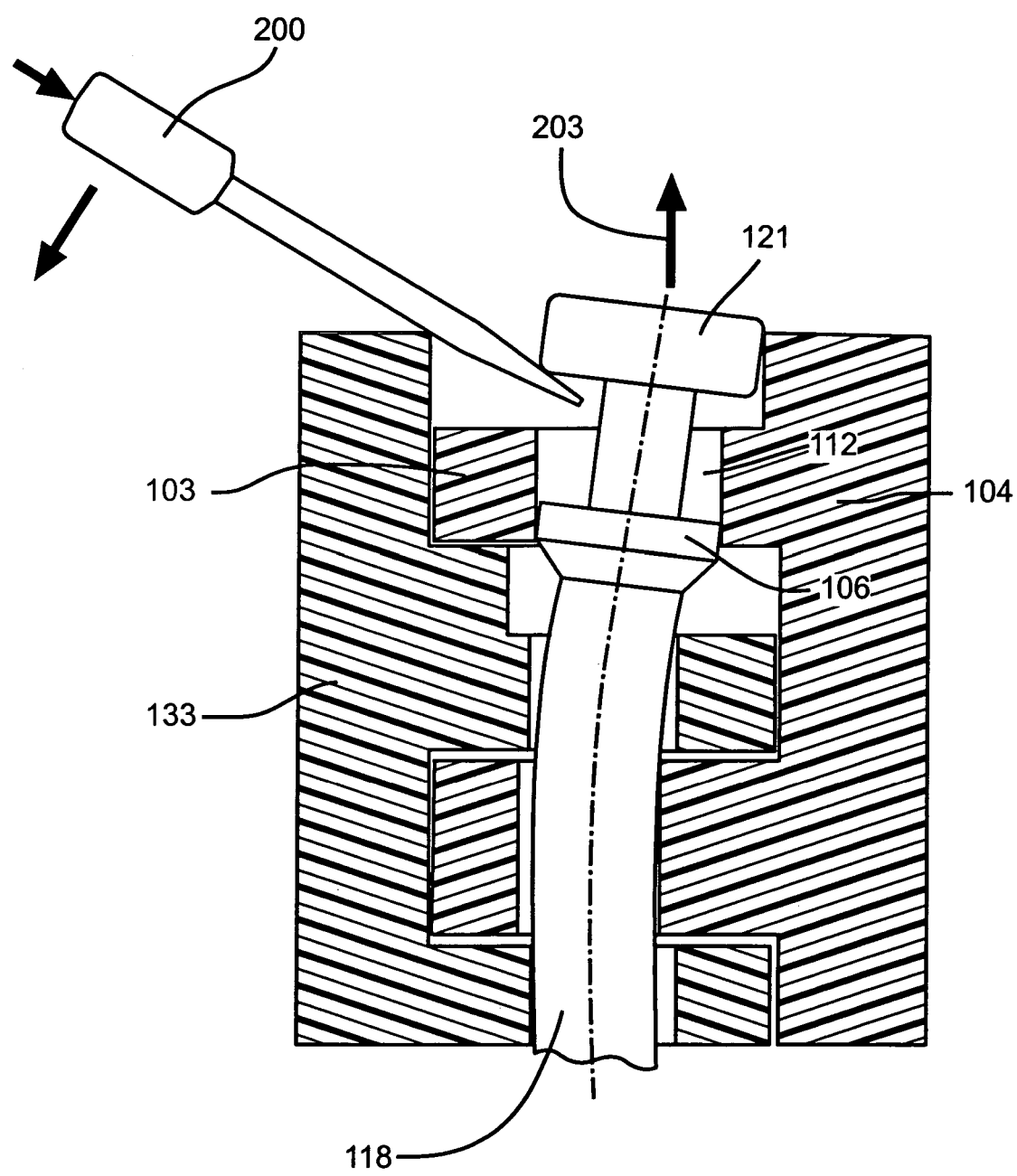
FIG. 7 is a cross-sectional view of the belt shown in FIG. 5 during removal of the pivot rod with a screw driver; and, FIG. 8 is a cross-sectional plan view of an alternate embodiment of the present invention.

As shown in FIG. 7, the pivot rod 118 may be removed by use of a screw driver 200. The screw driver 200 may be inserted under the head 121 of the pivot rod 118 to provide leverage for bending the rod 118 to align it with the opening 112 in the outermost link end 103 in the first module 104. Once the retaining ring 106 is aligned with the opening 112 the pivot rod 118 may be removed by sliding it outward in the direction indicated by arrow 203.

Turning to FIG. 8, an alternate embodiment of the present invention is shown. A belt 300 is formed from modules 303 and 306. The modules have outer link ends 309, 312. Link end 309 on module 306 has extra width to accommodate an internal opening 315 for receiving retaining ring 360 on pivot rod 319. Link end 312 on module 303 intercalates adjacent to link end 309 as shown. The link end 309 also includes a recessed portion 318 for receiving end portion 346 of pivot rod 319.

Link end 309 also includes an opening 321 having the same diameter as opening 315. Openings 315 and 321 have a diameter $D_1$ that is approximately equal to or smaller than the diameter $D_r$ of ring 360. The link end 312 and the link ends disposed toward the middle of the belt have openings with a Diameter D2 that is smaller than D1. The longitudinal axis 325 of openings 315 and 321 is offset from the longitudinal axis 330 of the opening in link end 312 and the openings toward the middle of the belt module.

Accordingly, during insertion of the pivot rod 319, the pivot rod 319 has to be bent and once the ring 360 clears the opening 315 it shifts to the left with respect to FIG. 8 such that shoulder 375 engages the link surface around opening 315.

The embodiment of FIG. 8 may also be provided with a pivot rod 118 (FIG. 5) having different diameters located above and below the retaining ring 106. In the example shown, the diameter of the rod between the retaining ring and the head is smaller than the diameter of the rod between the retaining ring and the second end of the rod.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A modular belt, comprising:
 a first belt module having a first plurality of link ends, each link end having opposed side walls providing a first transverse thickness connected to an intermediate section at a first proximal portion and extending from the intermediate section in a direction of belt travel to a first distal portion at the link ends, the first plurality of link ends having first openings through the first transverse thickness between and to the opposed side walls, the first belt module having an outermost link end having opposed side walls providing a second transverse thickness connected to the intermediate section at a second proximal portion and extending from the intermediate section in a direction of belt travel to a second distal portion at the link ends, the outermost link end having a second opening through the second transverse thickness between and to the opposed side walls, the second transverse thickness being less than the first transverse thickness, the second opening having an inner diameter that is greater than an inner diameter of the first openings, the second opening having a central longitudinal axis that is offset in the direction of belt travel from a central longitudinal axis of the first openings;

a second belt module having a first plurality of link ends, each link end having opposed side walls providing a first transverse thickness connected to an intermediate section at a first proximal portion and extending from the intermediate section in a direction of belt travel to a first distal portion at the link ends, the first plurality of link ends having first openings through the thickness between and to the opposed sidewalls, the second belt module having an outermost link end having opposed side walls providing a second transverse thickness connected to the intermediate section at a second proximal portion and extending from the intermediate section in a direction of belt travel to a second distal portion at the link ends, the second transverse thickness being less than the first transverse thickness such that a recessed portion is formed in the second belt module; and, a pivot rod having an elongate body with a first diameter, the pivot rod having a first end disposed opposite from a second end, the pivot rod having a longitudinal axis disposed transverse to the direction of belt travel, the pivot rod having a head with a diameter greater than the first diameter and having a retaining ring with an outside diameter greater than the first diameter disposed in spaced apart relation to the head in the direction of the longitudinal axis, the pivot rod capable of being disposed through the first and second openings in adjacent first and second belt modules such that the retaining ring is disposed in the recessed portion in the second module abutting against the side wall of the outermost link end of the first module and the head is disposed against the opposite side wall of the outermost link end of the first module when the first and second modules are intercalated.

2. The modular belt of claim 1, wherein the retaining ring has a diameter that is larger than the inner diameter of the second opening in the first belt module.

3. The modular belt of claim 1, wherein the first openings in the second belt module have an inner diameter that is substantially equal to the inner diameter of the first openings in the first belt module.

4. The modular belt of claim 1, wherein the retaining ring has a beveled edge.

5. The modular belt of claim 1, wherein the pivot rod has a second diameter located between the head and the retaining ring, the second diameter being less than the first diameter of the pivot rod.

6. A modular belt, comprising:
a first belt module having a first plurality of link ends, each link end having opposed side walls providing a first transverse thickness connected to an intermediate section at a first proximal portion and extending from the intermediate section in a direction of belt travel to a first distal portion at the link ends, the first plurality of link ends having first openings through the first transverse thickness between and to the opposed side walls, the first belt module having an outermost link end having opposed side walls providing a second transverse thickness connected to the intermediate section at a second proximal portion and extending from the intermediate section in a direction of belt travel to a second distal portion at the link ends, the outermost link end having a second opening through the second transverse thickness between and to the opposed side walls, the second transverse thickness being less than the first transverse thickness, the second opening having an inner diameter that is greater than an inner diameter of the first openings, the second opening having a central longitudinal axis that is offset in the direction of belt travel from a central longitudinal axis of the first openings;

a second belt module having a first plurality of link ends, each link end having opposed side walls providing a first transverse thickness connected to an intermediate section at a first proximal portion and extending from the intermediate section in a direction of belt travel to a first distal portion at the link ends, the first plurality of link ends having first openings through the first transverse thickness between and to the opposed sidewalls, the second belt module having an outermost link end having opposed side walls providing a second transverse thickness connected to the intermediate section at a second proximal portion and extending from the intermediate section in a direction of belt travel to a second distal portion at the link ends, the second transverse thickness being less than the first transverse thickness such that a recessed portion is formed in the second belt module; and, a pivot rod having an elongate body with a first diameter, the pivot rod having a first end disposed opposite from a second end, the pivot rod having a longitudinal axis disposed transverse to the direction of belt travel, the pivot rod having a head with a diameter greater than the first diameter and having a retaining ring with an outside diameter greater than the first diameter disposed in spaced apart relation to the head in the direction of the longitudinal axis, the body of the pivot rod having a second diameter between the head and the retaining ring, the second diameter being less than the first diameter, the pivot rod capable of being disposed through the first and second openings in adjacent first and second belt modules such that the retaining ring is disposed in the recessed portion in the second module abutting against the side wall of the outermost link end of the first module and the head is disposed against the opposite side wall of the outermost link end of the first module when the first and second modules are intercalated.

7. The modular belt of claim 6, wherein the retaining ring has a diameter that is larger than the inner diameter of the second opening in the first belt module.

8. The modular belt of claim 6, wherein the first openings in the second belt module have an inner diameter that is substantially equal to the inner diameter of the first openings in the first belt module.

9. The modular belt of claim 6, wherein the retaining ring has a beveled edge.

10. A modular belt, comprising:
a first belt module having a first plurality of link ends, each link end having opposed side walls providing a first transverse thickness connected to an intermediate section at a first proximal portion and extending from the intermediate section in a direction of belt travel to a first distal portion at the link ends, the first plurality of link ends having first openings through the first transverse thickness between and to the opposed side walls, the first belt module having an outermost link end having opposed side walls providing a second transverse thickness connected to the intermediate section at a second proximal portion and extending from the intermediate section in a direction of belt travel to a second distal portion at the link ends, the outermost link end having a second opening through the second transverse thickness between and to the opposed side walls, the second opening having an inner diameter that is greater than an inner diameter of the first openings, the second opening having a central longitudinal axis that is offset in the direction of belt travel from a central longitudinal axis of the first openings;

a second belt module having a first plurality of link ends, each link end having opposed side walls providing a first transverse thickness connected to an intermediate section at a first proximal portion and extending from the intermediate section in a direction of belt travel to a first distal portion at the link ends, the first plurality of link ends having first openings through the thickness between and to the opposed sidewalls, the second belt module having a second plurality of link ends with second openings defined therein, the second belt module having an outermost link end having a recessed portion; and, a pivot rod having a first end disposed opposite from a second end and having a first diameter, the pivot rod having a retaining ring disposed in spaced apart relation to the first end, the retaining ring having an outside diameter greater than the first diameter, the pivot rod capable of being disposed through the first and second openings in adjacent first and second belt modules such that the retaining ring is disposed in the recessed portion.

* * * * *